(12) United States Patent
Nilsson et al.

(10) Patent No.: US 12,132,518 B2
(45) Date of Patent: Oct. 29, 2024

(54) POSITIONING AND IDENTIFICATION OF ELECTRONIC LABELS USING A CAMERA

(71) Applicant: PRICER AB, Stockholm (SE)

(72) Inventors: Björn Nilsson, Stockholm (SE); Aleksander Ivanovski, Stockholm (SE)

(73) Assignee: Pricer AB, Stockholm (SE)

( * ) Notice: Subject to any disclaimer, the term of this patent is extended or adjusted under 35 U.S.C. 154(b) by 148 days.

(21) Appl. No.: 17/756,878

(22) PCT Filed: Dec. 4, 2020

(86) PCT No.: PCT/EP2020/084734
§ 371 (c)(1),
(2) Date: Jun. 3, 2022

(87) PCT Pub. No.: WO2021/110966
PCT Pub. Date: Jun. 10, 2021

(65) Prior Publication Data
US 2023/0074046 A1     Mar. 9, 2023

(30) Foreign Application Priority Data

Dec. 4, 2019   (EP) ..................... 19213648

(51) Int. Cl.
*G06V 10/62*   (2022.01)
*G06T 7/73*    (2017.01)
(Continued)

(52) U.S. Cl.
CPC ............. *H04B 10/116* (2013.01); *G06T 7/73* (2017.01); *G06V 10/25* (2022.01); *G06V 10/62* (2022.01);
(Continued)

(58) Field of Classification Search
None
See application file for complete search history.

(56) References Cited

U.S. PATENT DOCUMENTS

2015/0317682 A1* 11/2015 Kayser ............... G06Q 30/0267
                                                          705/14.58
2018/0166046 A1   6/2018 Yamazaki et al.
(Continued)

FOREIGN PATENT DOCUMENTS

WO     2017055119 A1    4/2017

OTHER PUBLICATIONS

International Search Report and Written Opinion for PCT Application No. PCT/EP2020/084734, mailed on Feb. 23, 2022, 9 pages.

*Primary Examiner* — Jefferey F Harold
*Assistant Examiner* — Charles N Hicks
(74) *Attorney, Agent, or Firm* — Brake Hughes Bellermann LLP

(57) ABSTRACT

A method (100) and system (300) for determining an identity and a position of at least one electronic label in a retail environment is provided. The system comprising a camera (310) arranged to capture at least one image of the electronic label and wherein the camera is arranged to transmit a control signal. The system further comprises an electronic label (320) adapted to receive the control signal and adapted to change its optical output in response to said control signal, and the electronic label is arranged in the field of view of the camera. Further, the system comprises a control unit (330) adapted to communicate with the camera (310) and configured to detect an identifier of the electronic label (320) by analyzing the optical output in the image and configured to determine position of the electronic label based on the position of the electronic label in the image.

18 Claims, 7 Drawing Sheets

(51) Int. Cl.
*G06V 10/25* (2022.01)
*G06V 20/10* (2022.01)
*G06V 20/50* (2022.01)
*G06V 20/52* (2022.01)
*G06V 20/60* (2022.01)
*H04B 10/116* (2013.01)
*H04N 7/18* (2006.01)
*H04N 23/66* (2023.01)

(52) U.S. Cl.
CPC .............. *G06V 20/10* (2022.01); *G06V 20/50* (2022.01); *G06V 20/52* (2022.01); *G06V 20/60* (2022.01); *H04N 7/18* (2013.01); *G06V 2201/02* (2022.01); *H04N 23/66* (2023.01)

(56) References Cited

U.S. PATENT DOCUMENTS

| | | |
|---|---|---|
| 2019/0311489 A1 | 10/2019 | Lam et al. |
| 2021/0097898 A1* | 4/2021 | Zhao ................... G09F 3/208 |

* cited by examiner

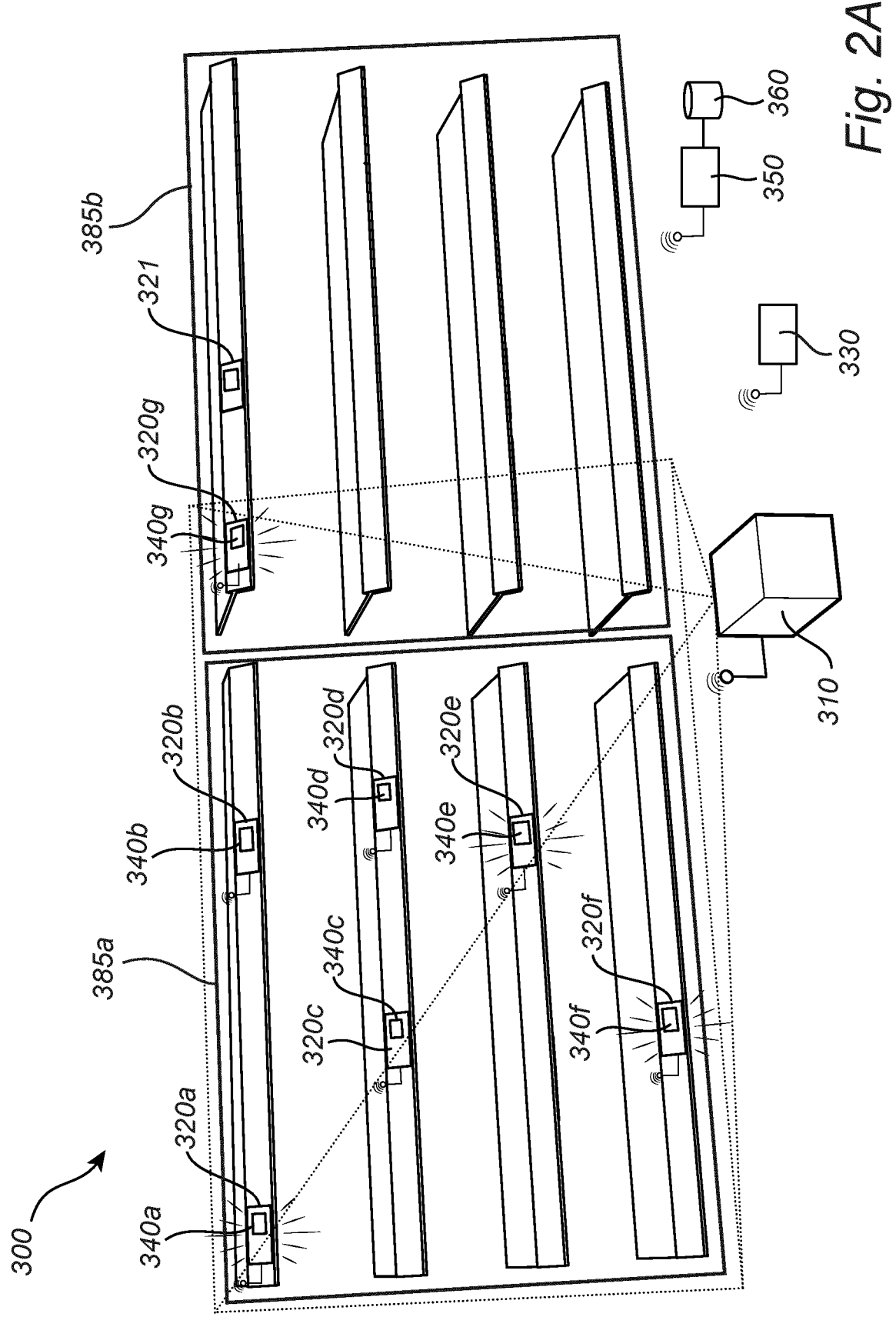

POSITIONING AND IDENTIFICATION OF ELECTRONIC LABELS USING A CAMERA

CROSS REFERENCE TO RELATED APPLICATIONS

This application is a 35 U.S.C. § 371 National Phase Entry Application from PCT Application No. PCT/EP2020/084734, filed on Dec. 4, 2020, entitled "POSITIONING AND IDENTIFICATION OF ELECTRONIC LABELS USING A CAMERA", and designating the U.S., which in turn claims priority to EP Application No. 19213648.9 filed on Dec. 4, 2019, the disclosures of which are incorporated by reference herein in their entireties.

FIELD OF THE INVENTION

The present disclosure generally relates to estimation of a position of an electronic label and more specifically method and system for identifying and determining position of electronic labels using a camera.

BACKGROUND

Products in a retail store may be arranged at or close to respective product positions along fixtures such as shelves, racks or other displays. The product positions may for example be selected to maximize sales by promoting certain products and/or to improve logistics of the store. Product positions for at least some products may be changed quite often and it may be difficult to maintain an updated record of the actual product positions.

Knowledge of the actual product positions may for example save time when products are restocked as persons bringing new items of the products to the fixtures of the store (e.g. from a storage room, a warehouse, or a supply truck) need not search through the fixtures of the store for the correct product positions at which to arrange the new items of the respective products.

The position of an object may generally be determined or estimated using signals transmitted between the object and a number of reference points. Received signal strengths for such signals indicate the distances travelled by the signals, which may be employed to estimate the distances between the object and the reference points. Using methods such as trilateration, the position of the object may then be estimated based on these distances. The positioning of the object may also be achieved by a subsequent event such as detection of the object reacting to the signal. Since the positions of the objects are unknown the signal sent to the objects are naturally sent to a wide range of objects wherein not all are subjected to be positioned.

A retail store may contain many obstacles (such as fixtures and products) which may obstruct signals or which may cause signals to be reflected (or attenuated) before reaching a sensor recording the received signal strength which may result in the signals being unidentified by the sensor.

European patent EP3154008B1 describes a method and system for analyzing an image of a fixture in order to determine the position of an electronic label and associated products. The positioning is achieved by using temporal pattern of optical changes of the electronic label.

The above described positioning methods may therefore be relatively inaccurate or require relatively much processing resources when applied in a retail store. Hence, new methods and systems for estimating positions are desirable.

SUMMARY

It would be advantageous to achieve a method and/or system for identifying and positioning electronic labels overcoming, or at least alleviating, the above mentioned drawbacks. In particular, it would be desirable to enable identification and positioning of electronic labels using a camera in order to optimize data processing and transmission.

To better address one or more of these concerns, a method and system having the features defined in the independent claims are provided. Preferable embodiments are defined in the dependent claims.

Hence, according to an aspect, a method for determining an identity and a position of at least one electronic label in a retail environment is provided. Each electronic label comprises a respective receiver for receiving a control signal and is adapted to change its optical output in response to the control signal. The at least one electronic label is arranged within the field of view of a camera comprising a transmitter for transmitting a control signal. The method comprises transmitting a control signal from the camera, receiving by the respective receiver, the control signal from the camera, and controlling the at least one electronic label to change its optical output based on the control signal.

The method further comprises capturing, by the camera, an image containing the at least one electronic label, detecting an identifier of each of the at least one electronic label by analyzing the optical output in the image, and determining a position for each of the at least one electronic label based on the position of the at least one electronic label in the image.

By a change in optical output may be meant that the optical output of the electronic label may be changed such that a display device changes displayed information and/or a light emitting device changes its emitted light.

By capturing an image it may here be meant that at least one image is captured. For example, a plurality of images may be captured.

By control signal it may be meant a signal to instruct or control the receiving device. The control signal may comprise detailed instruction on how to act upon reception of the control signal and/or simply instructions to initiate one or more predetermined actions upon reception of said control signal.

By an identifier it may be meant at least one of a hash code, a numeric code, a hexadecimal code, a binary code. In other words the identifier may comprise an identifying string of text, numbers, hexadecimal code, binary code or the like.

By determining a position, it may be meant that a position of the electronic label is determined relatively or absolutely. In other words, the position may be a relative position or an absolute position. The absolute position may be spatial coordinates originating from a known position. The relative position may be a position relative other position(s), such as position of other electronic labels, the camera or other detected features in the image. The relative position may be defined by spatial coordinates. The spatial coordinates may be expressed in at least two of three dimensions. The position of the electronic label in relation to the camera may be known or calculated.

By a position of the at least one electronic label in the image, it may be meant that the at least one electronic label is captured in the image and is positioned in the image. In other words, by a position in the image it may be meant coordinates in an image.

By analyzing the optical output, it may be meant that the image may be analyzed for changes in optical output from the electronic label. In other words, the image may be analyzed for detecting the change or changes in optical output in order to detect the identifier of each of the at least one electronic label.

Generally, this may provide for initiating fewer electronic labels to change their respective optical output compared to transmitting a control signal targeting all electronic labels in a retail area. Consequently, this may provide decreased power consumption since fewer electronic labels may be triggered to change their respective optical output.

Transmitting a control signal from the camera may provide triggering electronic labels arranged in a predetermined range and/or direction from the camera. in this way, the control signal may be limited to the targeted electronic labels arranged in a predetermined range from the camera. Consequently, this may provide that electronic labels arranged in the field of view of the camera to receive the transmitted control signal. This, since there may be a reduced amount of electronic labels reached by the control signal transmitted compared to a system where all electronic labels are controlled to change their optical output or have their positions determined at the same time. In other words, a subset of electronic labels may be reached by the control signal wherein the subset of electronic labels is at least a part of a set of electronic labels within a retail environment. This may also provide a decreased data processing and a decreased data transmission. Further, by having the camera control the electronic labels to change their optical output via a control signal, each camera arranged in the retail area may be involved in determining positions and identities of electronic labels, thus allowing for determining identities and positions in parallel, i.e. in a distributed manner. The control signal may be transmitted by beamforming technology. In other words, the control signal may be a directed signal in a certain direction. The signal may also be directed optically. As a non-limiting example, the transmitted control signal may be directed by reflection and/or focusing of the transmitted control signal.

Receiving, by the respective receiver, the control signal from the camera may provide ensuring or increasing the likelihood that that electronic labels arranged in a predetermined range from the camera receive the control signal. This may provide a lower power consumption by a reduced amount of electronic labels receiving the control signal. I.e. this may provide a reduced amount of electronic labels that may otherwise be unnecessary initiated.

Controlling the at least one electronic label to change its optical output facilitates identifying a specific electronic label. This may also provide that the electronic labels that have received the control signal may have their optical output changed.

Capturing, by the camera, an image containing the at least one electronic label may provide facilitated detection of electronic labels. This by receiving information from several electronic labels simultaneously which may save time, power and/or processing resources needed. This may also provide facilitated transmission of the identifier from the electronic label to the camera.

Detecting an identifier of each of the at least one electronic label by analyzing the optical output in the image may provide facilitated detection of the electronic labels.

Determining a position for each of the at least one electronic label based on the position of the at least one electronic label in the image may provide facilitated control of product position and related product information.

Hence, the method according to claim 1 may also provide at least one of saving time, decreasing processing power, decreasing power consumption and facilitating positioning of electronic labels.

According to an embodiment, the change of optical output of the at least one electronic label includes a distinct temporal pattern of optical changes for each label. The capturing, by the camera, may comprise capturing images by the camera at points in time such that the distinct temporal pattern of optical changes is distinguishable in the images. The detecting an identifier of the at least one electronic label by analyzing the optical output in the image may comprise detecting the distinct temporal pattern of optical changes.

By a distinct temporal pattern of optical changes it may be meant that the optical changes are changing in a distinct way characteristic for a certain electronic label. Thus, the electronic label may be identified using the distinct temporal pattern of optical changes.

This may provide an improved identification of the at least one electronic label. This may also provide identification of multiple electronic labels simultaneously since if there are several electronic label they change their optical output respectively according to a distinct temporal pattern for each electronic label. By identifying multiple electronic labels simultaneously less time may be required. Consequently, less power may be needed in order to identify the electronic labels since the electronic labels may need to change their optical output for a shorter time period. This may also provide less processing power since relatively simple image detection and image processing may be used in order to detect the electronic labels in the captured image.

According to an embodiment the method may further comprise controlling the at least one electronic label to change its optical output according to a second pattern of optical changes based on the control signal and capturing, by the camera, an image containing the at least one electronic label. The method may further comprise determining a region of interest in the image for the at least one electronic label wherein the region of interest is associated with a position of the at least one electronic label in the image. The method may further comprise that the step of detecting an identifier of the at least one electronic label by analyzing the optical output in the image may comprise detecting the distinct temporal pattern of optical changes by analyzing the image based on the determined region of interest.

By a region of interest, it may be meant an area of at least part of the image. In other words, by a region of interest it may be meant a region comprising at least part of the image.

By based on the determined region of interest it may be meant that information in an image within the determined region of interest is used. In other words, coordinates associated with the region of interest may be used to analyze at least part of an image.

By the region of interest is associated with a position of the at least one electronic label in the image, it may be meant that the region of interest comprises at least part of an image comprising the electronic label.

Hence, by detecting the distinct temporal pattern of optical changes by analyzing the image based on the determined region of interest, it may be meant that the distinct temporal pattern of optical changes is detected by analyzing at least part of the image, wherein part of the image defined by the region of interest. If there are several electronic labels present, there may be several regions of interest. There may be as many regions of interest as the number of detected electronic labels.

By determining a region of interest wherein the region of interest is associated with a position of the at least one electronic label in the image may provide for facilitated determination of the identifier since a reduce amount of data need to be analyzed in order to detect the distinct temporal pattern of optical changes in images captured with the same camera. This may significantly decrease the computer processing since the amount of analyzed data is significantly degreased. This may in turn facilitate performing the method within the camera.

According to an embodiment, the change in optical output of the at least one electronic label includes displaying a visual reference.

By a visual reference may be meant that the display of the electronic label changes output into displaying information such as at least one of a QR code, a number, a message, a picture and the like that the camera may be able to detect.

By displaying a visual reference there may be a rapid detection provided of the electronic label in the captured image. This, since one captured image may be enough to determine the identity of several electronic labels simultaneously.

According to an embodiment, transmitting a control signal from the camera comprises transmitting at least one of a Wifi signal, an IR signal, a BLE signal, an NFC signal, a RF signal, an optical signal and a sound signal.

By BLE signal is meant a Bluetooth Low Energy signal. By NFC signal is meant a near-field communication signal. By RF signal is a radio frequency signal. By optical signal is meant a signal of optical character, i.e. an electromagnetic signal in either the UV-, the visible- or the IR spectra.

By transmitting a control signal from the camera comprising at least one of a Wifi signal, an IR signal, a BLE signal, an NFC signal, a RF signal, an optical signal and a sound signal a limitation in electronic labels reached by the control signal may be provided. This since the control signal may a limited range. Hence, this may provide the possibility to target a number of electronic labels being part of a system comprising a plurality of electronic labels wherein at least part of the electronic labels may be arranged out of range of the control signal.

According to an embodiment transmitting a control signal from the camera comprises broadcasting a control signal from the camera to electronic labels within the field of view of the camera.

By broadcasting is may be meant transmitting a control signal without any prior knowledge of at least one of the location and the identity of the recipient. In other words, by broadcasting may be meant that a control signal is sent without knowledge of the recipient.

Broadcasting the control signal provides that the system does not need prior knowledge of the recipients of the control signal.

Additionally, broadcasting the control signal may provide facilitated installation since the system does not need prior knowledge of the recipient of a control signal sent from, for example, a camera. Hence, when installing the electronic labels there is no need of keeping track of what units to pair to which camera etc.

According to an embodiment the camera is further arranged to transmit the image comprising the at least one electronic label, and a server is arranged to receive the image of the electronic label. The method may further comprise transmitting the image of the electronic label from the camera, receiving, by the server, the image of the electronic label, and wherein the detecting an identifier of the electronic label by analyzing the optical output in the image is performed by the server, and wherein the determining of a position of the electronic label based on the position of the electronic label in the image is performed by said server.

Performing the step of detecting an identifier and determining a position may facilitate the computer processing since performing the calculations at a server may be less cumbersome for the system since a server may generally have better processing power compared to that of a camera.

According to an embodiment, determining a position of the electronic label comprises determining a spatial position.

By spatial position may be meant a position within the retail environment, the spatial position may be an absolute position or a relative position. The spatial position may be a position in at least two out of three dimensions.

According to an embodiment, the method further comprises storing (190) the position and the identifier of the electronic label.

Storing the position and the identifier may be performed by the camera and/or the server. Storing the position and the identifier of the electronic label may provide a facilitated inventory control. This, since it may provide the possibility of comparing future determined position and identity with previously determined position and identity.

According to an embodiment, the identifier of the electronic label is a local identifier.

By a local identifier may be meant an identifier of the electronic label having an identifier with less possible distinguishing variations. For example, a hash code. Which may be meant that at least one of a letter, symbol and number are present. The local identifier may then comprise less characters in order to have one specific electronic label distinguished from another compared to when distinguish an electronic label from another globally. In other word, a first number of electronic labels may form a set of electronic labels and a second number of electronic labels may form a subset of electronic labels. The subset of electronic labels may be at least part of the set of electronic labels. The set of electronic labels may comprise a global identifier and the subset of electronic labels may comprise a local identifier. The local identifier may comprise less characters than the global identifier, i.e. a shorter hash-code or the like.

The electronic labels may comprise a globally unique identifier that's given during manufacturing and a subset of this global unique identifier may be used as the local identifier.

This may provide a facilitated computer processing since fewer parameters has to be compared in order to identify a device.

According to an embodiment the system comprises a first and a second camera, the second camera being within the field of view of the first camera, and wherein the first camera is configured to detect the second camera by analyzing the image.

This may provide determining relative position between a first and second camera. This may provide determining a relative position between a set of electronic labels detected by the first camera and the second camera.

According to an embodiment the method further comprises receiving, by the camera, a start signal, start transmitting the control signal from the camera in response to said start signal.

This may facilitate initiating the method, since the camera may be controlled by a server and/or that the server may be used to coordinate initiation of electronic labels. Further this may provide that the system makes sure that several cameras do not transmit their control signal simultaneously and avoiding possible interference between the different cameras and/or electronic labels.

According to an embodiment the method further comprises detecting a display device associated with an electronic label by analyzing the image.

By a display device it may be meant a device displaying information relevant for the information presented on the associated electronic label and/or information associated with a position in the retail environment, e.g. a shelf position, a product position and/or the product itself. The display device may be a shelf talker. The display device may be an analogue display device, such as a printed information sign, and/or digital display device.

This may provide additional information that is presented together with the electronic label to also be detected. This may also provide the possibility of verifying that the display device is positioned by the correct electronic label and/or product.

According to a second aspect of the present invention a system for determining an identity and a position of an electronic label is provided. The system comprises a camera arranged to capture at least one image of the electronic label and wherein the camera is arranged to transmit a control signal. The system further comprises an electronic label adapted to receive the control signal and adapted to change its optical output in response to said control signal, the electronic label being arranged in the field of view of the camera. The system further comprises a control unit adapted to communicate with the camera and configured to detect an identifier of the electronic label by analyzing the optical output in the image and configured to determine a position of the electronic label based on the position of the electronic label in the image.

Generally, this may provide initiating less electronic labels to change its optical output compared to transmitting a control signal targeting several electronic labels. Consequently, this may provide decreased power consumption since less electronic labels may be triggered to change its optical output.

By at least one image it may be meant at least one of a single image, more than one image, a plurality of images and a video stream.

A camera being arranged to transmit a control signal may provide triggering electronic labels arranged in a predetermined range and/or direction from the camera. This may provide limiting the targeted electronic labels arranged in a predetermined range from the camera. Consequently, this may provide that electronic labels arranged in the field of view of the camera to receive the transmitted control signal, this since there may be a reduced amount of electronic labels reached by the transmitted control signal. In other words, a subset of electronic labels may be reached by the control signal wherein the subset of electronic labels is at least a part of a set of electronic labels within a retail environment. This may also provide a decreased data processing and a decreased data transmission.

An electronic label adapted to receive the control signal may provide making sure that that electronic labels arranged in a predetermined range from the camera receive the control signal. This may provide a lower power consumption by a reduced amount of electronic labels receiving the control signal. I.e. this may provide a reduced amount of electronic labels that may otherwise be unnecessary initiated.

A control unit according to the above may facilitate controlling the system in order to facilitate capturing an image and determining a position of the electronic label based on the position of the electronic label in the image.

Hence, the system according to the above may also provide at least one of saving time, decreasing processing power, decreasing power consumption and facilitating positioning of electronic labels.

According to an embodiment the camera is positioned at, at least one of a shelf, a ceiling and a wall.

This may provide for facilitated connection with the electronic label by having the camera positioned in a position where the electronic label is arranged in the field of view of the camera. This may in turn provide for facilitated detection and identification of the electronic labels.

According to an embodiment the camera is powered by at least one of a battery and an external power source.

A battery may provide facilitated installation since a connection to an external power source may not be needed. An external power source may provide the camera being less space demanding, since there may be no need for a battery within the camera.

According to an embodiment the camera is comprised in a mobile device.

By a mobile device it may be meant a movable device. By a mobile device it may be meant a portable device. By a mobile device it may here be meant a device being mobile and/or movable and could comprise at least one of a movable robot, part of a robot such as a moving arm of a stationary or movable robot, a drone, cellular device, smart phone, pad, tablet, computer, portable computer and any device suitable to carry a camera and being mobile and/or movable. The drone may be a flying drone configured to be autonomously controlled and/or user controlled.

This may provide that fewer cameras are needed in order to image more electronic labels compared to using stationary cameras, as the camera may be moved to the area in which it is needed.

It is noted that embodiments of the invention relate to all possible combinations of features recited in the claims. Further, it will be appreciated that the various embodiments described for the method are all combinable with the device as defined in accordance with the second aspect of the present invention.

BRIEF DESCRIPTION OF THE DRAWINGS

This and other aspects will now be described in more detail in the following illustrative and non-limiting detailed description of embodiments, with reference to the appended drawings.

FIGS. 2a-2c schematically illustrates a perspective view of the system according to an embodiment.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION

A system 300 for determining an identity and a position of an electronic label 320 according to an embodiment will be described with reference to FIG. 1a-1b. The electronic label 320 may be associated with a product type of one or more product units 327. The one or more product units 327 may be of same product and/or product type.

Figure 1A:
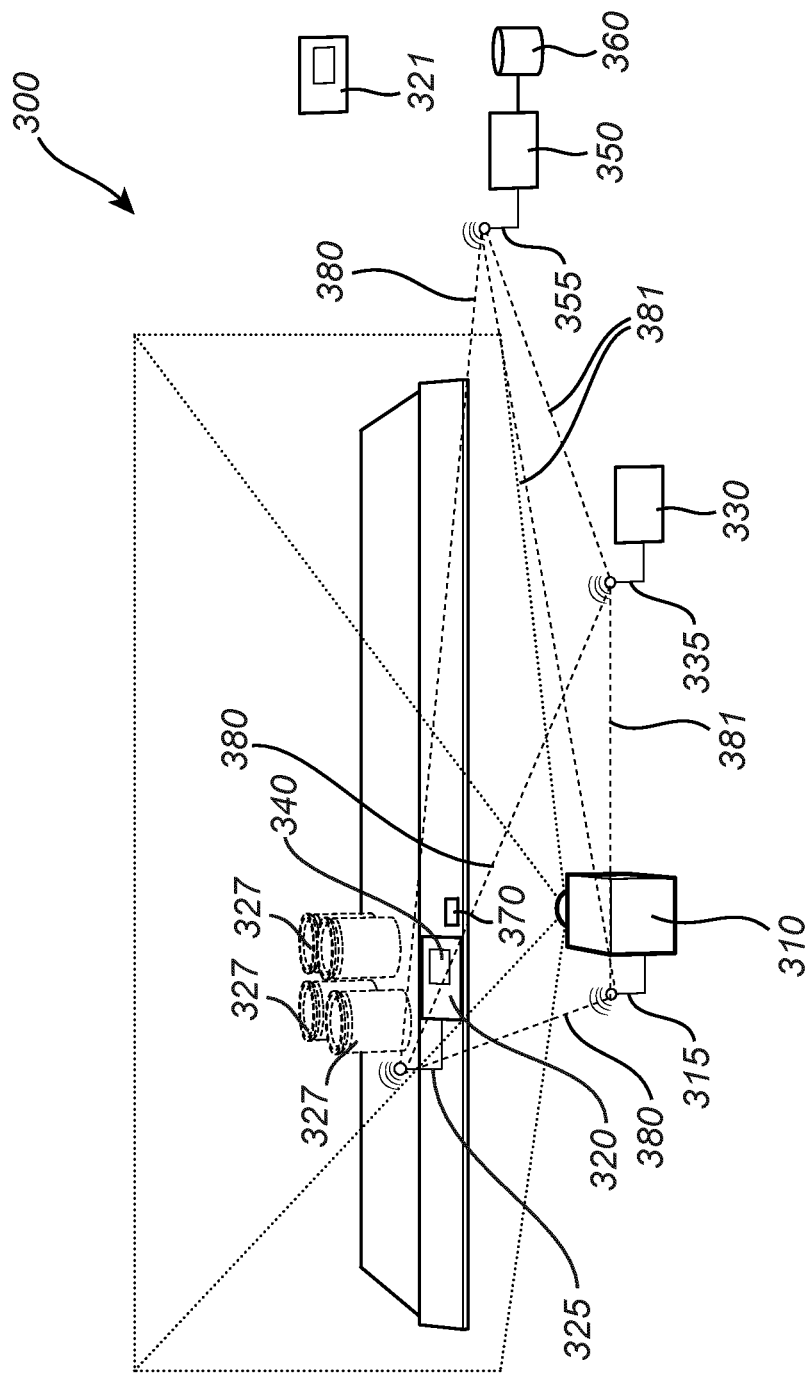
FIGS. 1a-1b schematically illustrates a perspective view of the system according to an embodiment.
Figure 1B:
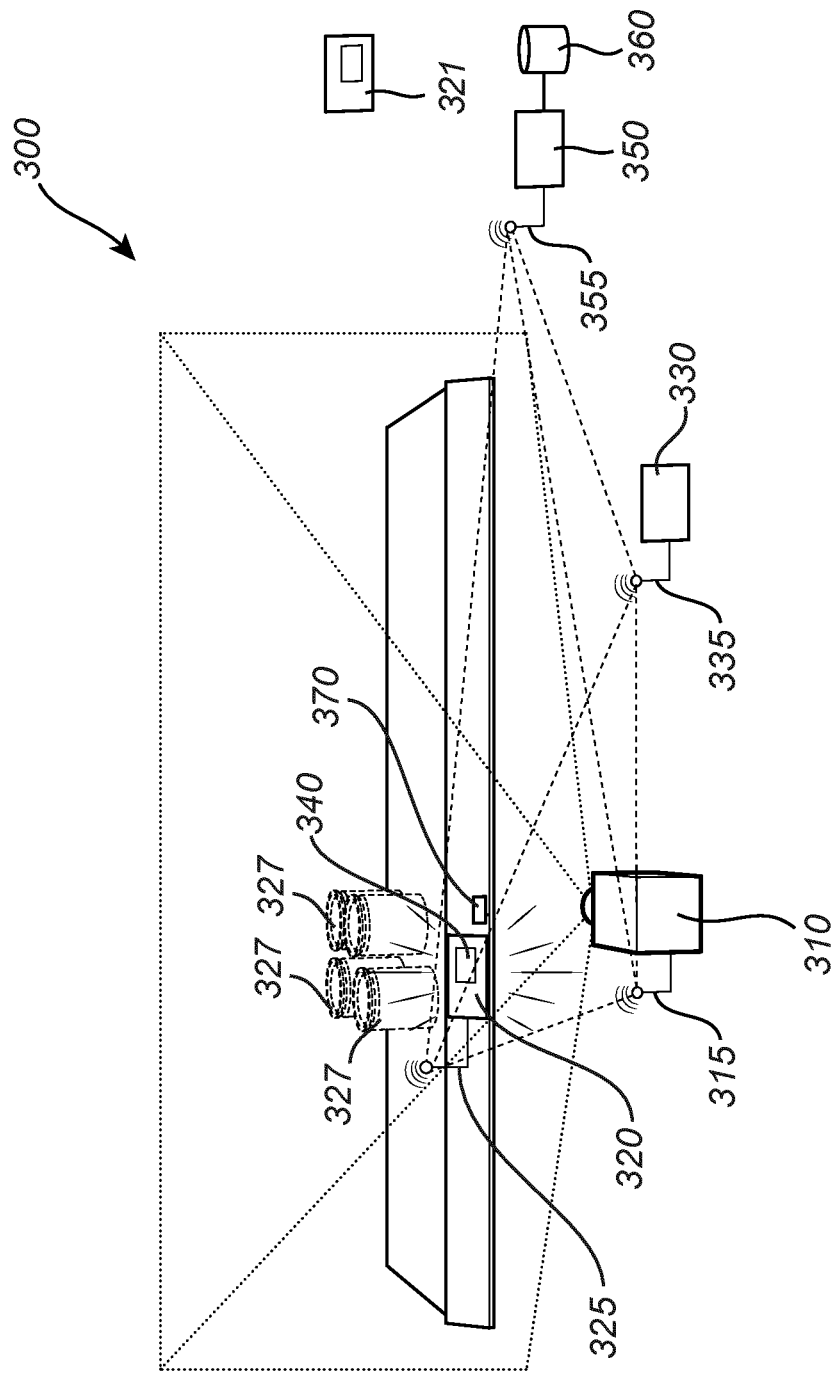

FIGS. 1a-1b illustrates the system 300. The system 300 may comprise a camera 310. The camera 310 may be arranged to capture at least one image of the electronic label 320 and the camera may be arranged to transmit a control signal 380, 381. The camera 310 may comprise a transceiver 315 for transmitting and/or receiving communication such as a command or a control signal 380, 381. The camera 310 may also comprise separate means for receiving and transmitting a signal. The transceiver 315 may be arranged to transmit and/or receive at least one of a Radio Frequency, RF, signal, a wireless, WIFI, signal, an Infrared, IR, signal, a Bluetooth, BT, signal, a Near-Field communication, NFC, signal, a Radio Frequency identification, RFID, signal, an optical signal, a sound signal or any signal suitable for communication.

The system may further comprise an electronic label 320. The electronic label 320 may be adapted to receive the control signal 380 and may be adapted to change its optical output in response to said control signal 380, the electronic label 320 being arranged in the field of view of the camera. There may be a plurality of electronic labels 320 present. Hence, at least one electronic label 320 may be present. The at least one electronic label 320 may comprise an optical output device 340. The optical output device 340 may comprise at least one of a LED, a display and any other visual device. The at least one electronic label 320 may comprise a receiver 325. The receiver 325 may be arranged to receive at least one of a Radio Frequency, RF, signal, a wireless, WIFI, signal, an Infrared, IR, signal, a Bluetooth, BT, signal, a Near-Field communication, NFC, signal, a Radio Frequency identification, RFID, signal, an optical signal, a sound signal or any signal suitable for communication.

The system may further comprise a control unit 330. The control unit 330 may be adapted to communicate with the camera 310 and configured to detect an identifier of the electronic label 320 by analyzing the optical output in the image and configured to determine a position of the electronic label 320 based on the position of the electronic label 320 in the image.

The control unit 330 may be arranged separately from the camera 310 or arranged within the camera 310. In other words, the camera 310 may comprise the control unit 330.

The control unit 330 may communicate with the camera by at least one of Radio Frequency, RF, signal, a wireless, WIFI, signal, an Infrared, IR, signal, a Bluetooth, BT, signal, a Near-Field communication, NFC, signal, a Radio Frequency identification, RFID, signal, an optical signal, a sound signal or any signal suitable for communication. The control unit 330 may comprise a transceiver 335. The control unit 330 may, by the transceiver 335, send a control signal 380, 381 arranged to be received by at least one of the server 350, the camera 310 and the electronic label 320, wherein the control signal 380, 381 may control at least one of the camera 310, the server 350 and the electronic label 320.

The system may further comprise a server 350 and a storage means 360. The server 350 may be communicatively connected to the storage means 360. The server 350 may further comprise a transceiver 355. The server 350 may, by the transceiver 355, send a control signal 380,381 arranged to be received by at least one of the camera 310, the control unit 330 and the electronic label 320, wherein the control signal 380, 381 may control at least one of the camera 310, the server 350 and the electronic label 320.

The camera 310 may, by the transceiver 315, transmit a signal arranged to be received by the at least one of the control unit 330, the electronic label 320 and the server 350. The signal transmitted from the camera may comprise at least one of a control signal, an image, a determined position, a determined identifier or any data relating to the electronic labels. The transceiver 315 may have a limited range and the at least one electronic label 320 arranged within the limited range may receive the control signal. Electronic labels being out of range may not receive the control signal and hence, may not change its optical output.

The camera 310 may transmit a control signal 380 directly to be received by the electronic label 320 and/or the camera 310 may transmit a control signal 380, 381 to be received by the electronic label 320 via at least one of the server 350 and the control unit 330.

At least one of the camera 310, the control unit 330 and the server 350 may be arranged to transmit a control signal 380, 381. The at least one of the camera 310, the control unit 330 and the server 350 may transmit the control signal 380, 381 without prior knowledge of the recipient, in other words the at least one of the camera 310, the control unit 330 and the server 350 may broadcast the control signal 380, 381. The at least one of the camera 310, the control unit 330 and the server 350 may transmit at least one of a radio signal, a WIFI signal, a BT signal, a NFC signal, a RFID signal, an optical signal, a sound signal or any signal suitable for communication.

The control signal 380, 381 transmitted by at least one of the camera 310, the control unit 330 and the server 350 may be received by at least one of the electronic label 320, the camera 310, the control unit 330 and the server 350.

The receiver 325 may be arranged to receive the control signal transmitted from at least one of the camera 310, the control unit 330 and the server 350. In response to reception of the control signal the electronic label 320 may be arranged to change its optical output. In other words, the electronic label 320 may be adapted to receive the control signal and may be adapted to change its optical output in response to said control signal.

FIGS. 1a-1b further illustrates a second electronic label 321 arranged outside the field of view of the camera 310, i.e. the second electronic label 321 may not be comprised in the system or the system may comprise at least one second electronic label 321 that may not be arranged within the field of view of the camera 310. The at least one second electronic label 321 may also be arranged out of range for the transmitted signal from at least one of the camera 310, the control unit 330 and the server 350.

In the system illustrated in FIG. 1a, at least one of the camera 310, the server 350 and the control unit 330 may transmit a control signal. At least one of the camera 310, the server 350 and the control unit 330 may broadcast the control signal. The control signal may subsequently be received by the at least one electronic label 320. The control signal may be received by the receiver 325.

FIG. 1b illustrates a change in optical output of the electronic label 320. The electronic label 320 may be controlled to change its optical output based on the control signal. The change in optical output may be achieved by the optical output device 340 changing its optical output. The camera may capture an image containing the at least one electronic label 320. The camera may capture a plurality of images containing the at least one electronic label 320. By a plurality of images, it may be meant a video stream and/or several still images captured at separate points in time. Hence, the camera may capture at least one image containing the at least one electronic label 320. The change of optical output of the at least one electronic label 320 may comprise a distinct temporal pattern of optical changes. The change in optical output of the at least one electronic label 320 may comprise displaying a visual reference, such as at least one of a barcode, a QRcode, a number, a letter and the combination thereof. The change in optical output may comprise changing the color output of the electronic label 320.

The change in optical output may be characteristic for each electronic label 320 in order to distinguish the specific electronic label 320 from another.

The characteristic change in optical output may be pre-programmed in the at least one electronic label 320 and/or communicated together with the control signal received by the electronic label 320. The characteristic change in optical output may be associated with an identifier of the electronic label.

The identifier may comprise at least one of a numeric code, a hexadecimal code, a binary code and any other means suitable for distinguishing or identifying the electronic label 320.

The identifier may be a global identifier or a local identifier. By global identifier it may be meant an identifier globally unique for each electronic label 320. Each electronic label 320 produced may have a unique global identifier in order to be able to distinguish an electronic label globally. This may require the allocated space for the identifier to be relatively large in comparison to the local identifier. By local identifier is meant that each electronic label may have a unique identifier locally, i.e. each electronic label 320 may be identified among a number of electronic labels arranged locally. The allocated space for the local identifier may be less in order for storing the local identifier compared to storing a global identifier. Hence, the local identifier may require less storage space. Subsequently, in order to communicate the identity of the electronic labels 320 less data may be transmitted when transmitting the local identifier and in turn this may save bandwidth and/or time while transmitting the identity of the electronic label. The local identifier may be a subset of the global identifier. The local identifier may be negotiated between the electronic labels before starting to change their respective optical output.

As previously discussed, after the electronic label 320 receives the control signal the electronic label 320 may be arranged to change its optical output. The camera 310 may capture at least one image of the electronic label 320 and the change in optical output may be detectable in the at least one image. The electronic label 321 that may be arranged outside the field of view of the camera 310 and that may be arranged out of range for the transmitted control signal will not change its optical output in response to said transmitted control signal. Hence, the number of electronic labels triggered to change their optical output is reduced or even kept to a minimum which in turn may save power consumption of the system 300.

As previously disclosed, the change in optical output may comprise at least one of a distinct temporal pattern of optical changes, displaying a visual reference, such as at least one of a barcode, a QR code, a number, a letter and the combination thereof or changing a color output of the electronic label 320.

The camera 310 may be capturing at least one image comprising the at least one electronic label at points in time such that the distinct temporal pattern of optical changes is distinguishable in the images. The distinct temporal pattern in the optical output in the at least one image may be analyzed in order to detect the identifier. In other words, a plurality of images may be captured and in the plurality of images the distinct temporal pattern of optical changes may be detected.

To further facilitate detecting the identifier of each electronic label the system may be configured to first determine a rough position for electronic labels arranged in the field of view of the camera 310. This may be achieved by determining a region of interest associated with the at least one electronic label 320 arranged in the field of view of the camera 310. For each electronic label 320 an associated region of interest may be determined. Hence, the system 300 may be configured to controlling the at least one electronic label to change its optical output according to a second pattern of optical changes based on the control signal. The control signal controlling a change in optical output according to a second pattern may be a control signal transmitted from the camera 310. The system 300 may further be configured to capturing, by the camera 310, an image containing the at least one electronic label 320. This may be performed prior to capturing an at least one image comprising the at least one electronic label at points in time such that the distinct temporal pattern of optical changes is distinguishable in the images.

The system 300 may be configured to determine a region of interest in the image for the at least one electronic label wherein the region of interest is associated with a position of the at least one electronic label in the image. Hence, coordinates of the location of each electronic label in images to be captured with the camera may be known. Based on this information, the positions of electronic label(s) in future acquisitions or capturing of images using the camera 310 may be known. The known positions of electronic labels may be a rough position, i.e. an estimate where the electronic label may be located in the images.

The system 300 may hence be further configured to detecting the distinct temporal pattern of optical changes by analyzing the image based on the determined region of interest when detecting an identifier of the at least one electronic label. Hence, only the region of interest in the images may be analyzed in order to detect the identifier of the at least one electronic label. In other words, only part of the captured images may be analyzed in order to detect the identifier of the at least one electronic label.

The analyzing may be achieved by image recognition algorithms. For example, the analyzing may be performed by comparing captured images and the change in optical output may be determined in the comparison. The comparison may be done on two or more images. The comparison may be done on a plurality of images. A change in optical output may be slower than the frame rate of the captured images and hence, a change in optical output may be detected comparing a plurality of images.

The camera 310 may be capturing an image comprising the at least one electronic label 320 such that the visual reference or the change in color output of the electronic label 320 is distinguishable. The visual reference and/or the change in color output of the electronic label 320 may be analyzed in order to detect the identifier.

The camera 310 may be powered by at least one of a battery and an external power source. The camera 310 may be arranged on or in at least one of a shelf, a ceiling, a wall and any other suitable position to capture images of the at least one electronic label 320. The camera 310 may also be mobile, i.e. the camera may be movable. The camera 310 may be comprised in a mobile device. In other words, the camera may be comprised in a movable device. The mobile device may comprise at least one of a movable robot, part of a robot such as a moving arm of a stationary or movable robot, a drone, cellular device and any device suitable to carry a camera and being mobile and/or movable. The drone may be a flying drone configured to be autonomously controlled and/or user controlled.

The position of the electronic label 320 in the at least one image may be determined, by means of at least one of image recognition, comparison to reference images or any method known in the art. The position for the electronic label 320 may be determined based on the determined position for the electronic label 320 in the image. This, since the position of the camera 310 may be known. The direction in which the camera 310 is pointing may also be known. The position and/or direction of which the camera 310 is pointing may be determined by detecting the display device 370 which may comprise position information.

The system 300 may further comprise a first and a second camera, the second camera may be within the field of view of the first camera, and the first camera may be configured to detect the second camera by analyzing the image. The first and/or second camera may comprise a visual identifier. The first and/or second camera may comprise an optical output and be arranged to change its optical output in response to a control signal. The change in optical output may comprise at least one of a distinct temporal pattern of optical changes, displaying a visual reference, such as at least one of a barcode, a QR code, a number, a letter and the combination thereof or changing a color output of the optical output of the first and/or second camera.

The first and/or second camera may comprise a unique identifier, wherein the identifier may be a local and/or a global identifier. The change in optical output may be associated with this identifier.

This may facilitate determining the position of at least one of said first and second camera since a position of one of said first and second camera may be known, and this may further facilitate the determination of position of the other camera. For example, if the position of the second camera is known, a facilitated positioning of the first camera may be achieved by detecting the second camera. Optionally or alternatively, the position of the first camera may be known and hence, determining the position of the second camera may be facilitated by detecting the second camera in an image captured by the first camera.

Hence, the determined position of the electronic label 310 may be a spatial position. Wherein the spatial position may be a position within the retail environment, the position within the retail environment may be determined in three dimensions.

The camera 310 may be arranged to transmit the image comprising the at least one electronic label 320 and the server 350 may be arranged to receive the image of the electronic label. Hence, the image captured by the camera 310 comprising the at least one electronic label 320 may be transmitted from the camera 310 to the server 350. The server 350 may detect the identifier by analyzing the optical output in the image. The analysis of the optical output in the image performed by the server 350 in order to detect the identifier may be performed as will be disclosed according to FIG. 2a-2c. Hence, determining the position of the electronic label 320 in the image, according to the above, may be performed by the server 350 and/or by the camera 310.

The server 350 may be arranged to transmit the position and the identifier of the electronic label 320 to the storage means 360. The storage means 360 may be arranged to store the determined position and the determined identity or identifier of the electronic label 320.

The at least one electronic label 320 may be arranged in or on a shelf or any other position where information associated with for example a product may be relevant to display.

Figure 2B:
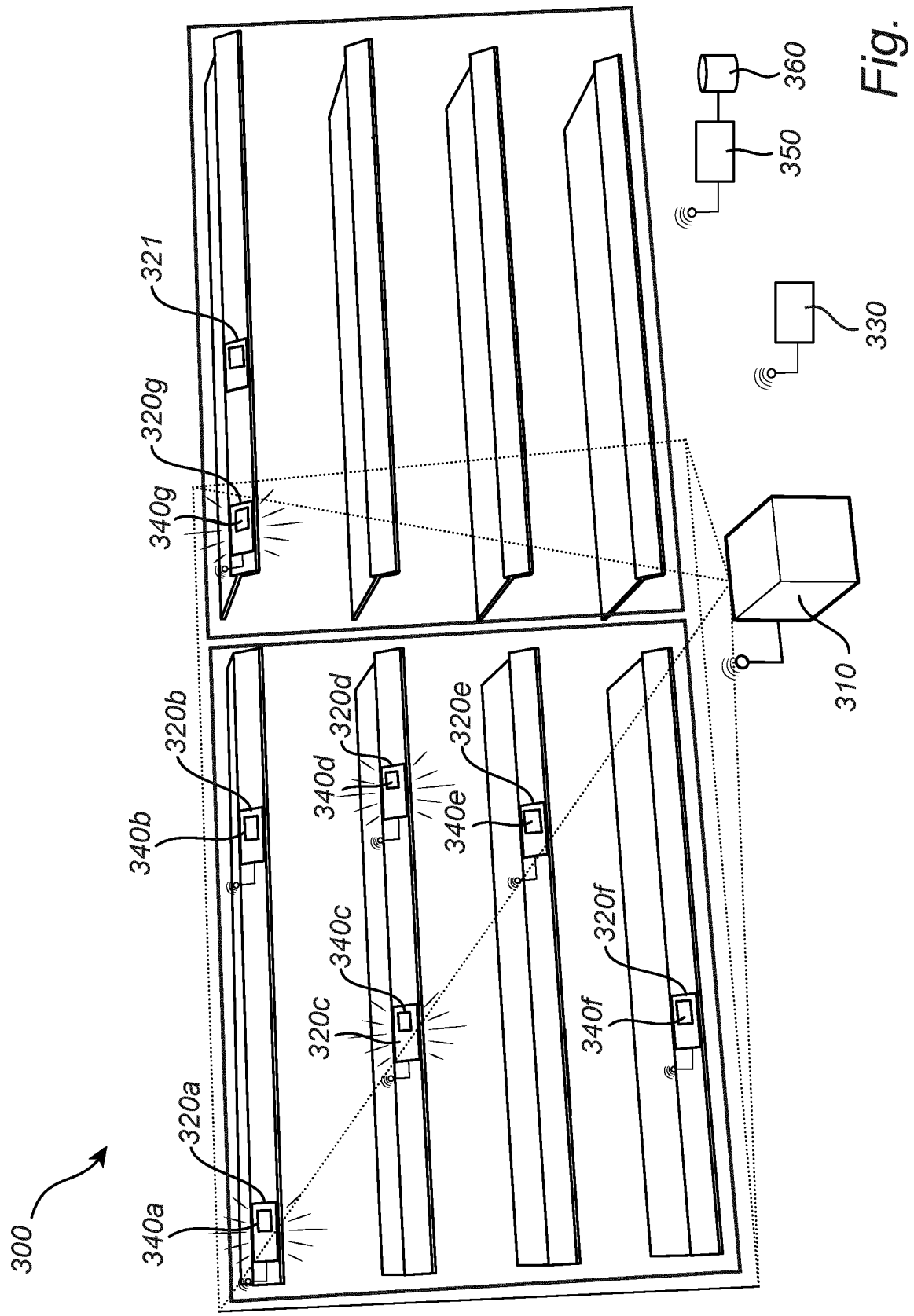
Figure 2C:
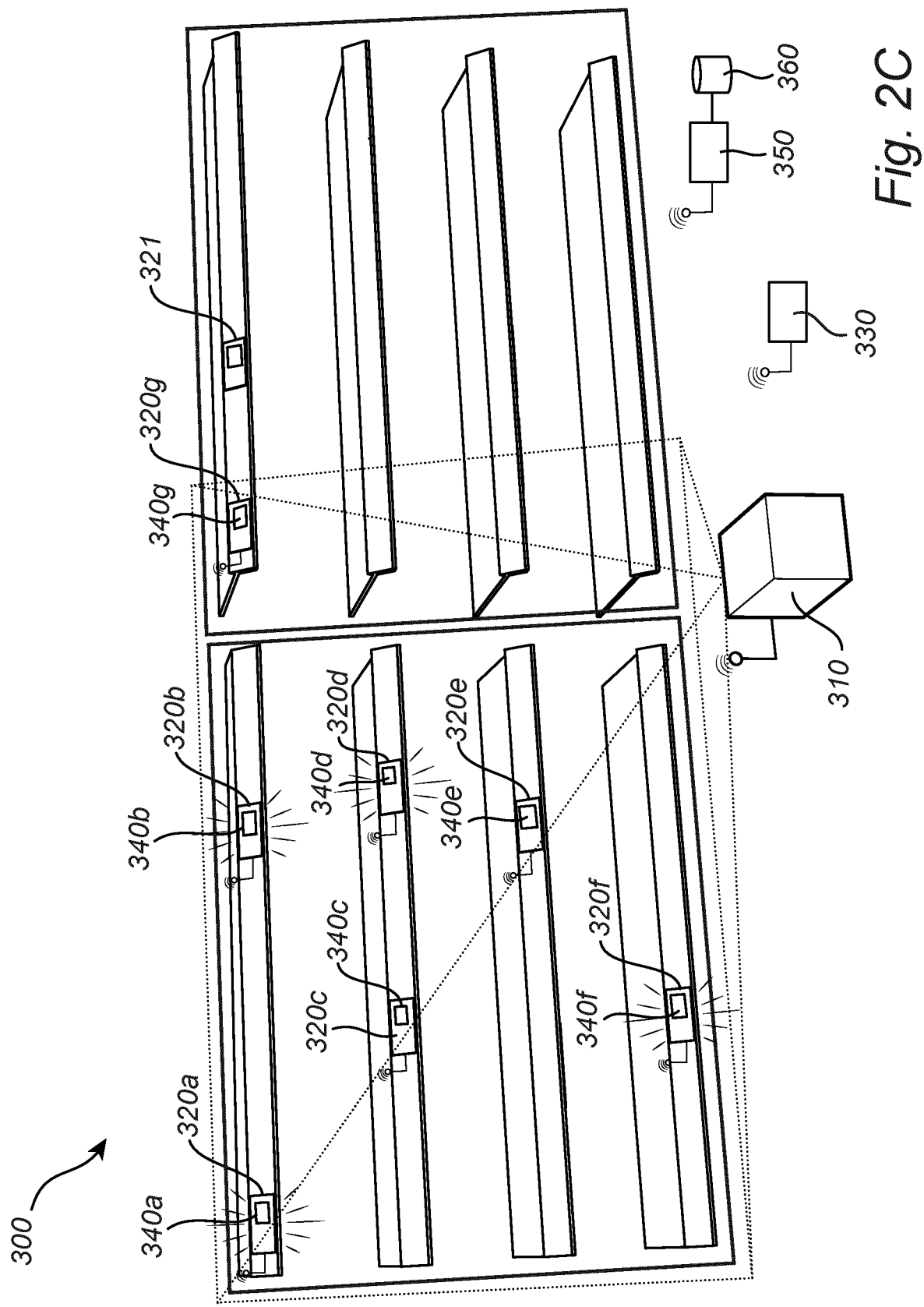

FIGS. 2a-2c schematically illustrates the system 300 similar to that of the system 300 in FIG. 1a-1b, except that in FIG. 2a-2c a plurality of electronic labels 320a-320g are arranged within the field of view of the camera 310. Same features discussed to the electronic label 320 in FIG. 1a-1b applies to the plurality of electronic labels 320a-320g in FIGS. 2a-2c. The control unit 330 and the server 350 illustrated in FIGS. 2a-2c has the similar functionality as the control unit 330 and server 350 in FIG. 1a-1b.

The electronic labels 320a-320g in FIG. 2a-2c are positioned in shelfs 385a, 385b. FIGS. 2a-2c further illustrates at least one electronic label 321 arranged outside the field of view of the camera 310. FIGS. 2a-2c schematically illustrates how the electronic labels 320a-320g may be changing their optical output, each in a characteristic way, in order for the identifier for each electronic label 320-320g to be detectable. The electronic labels 320a-320g in FIGS. 2a-2c may have received the control signal prior to starting the change in optical output. The control signal may have been transmitted, as previously disclosed to FIGS. 1a-1b, from either the camera 310, the server 350 or the control unit 330.

The optical output of each electronic label 320a-320g may be changed by changing the optical output of the respective optical output device 340a-340g.

FIGS. 2a-2c schematically illustrates the system 300 when the camera captures a sequence of images comprising the electronic labels 320a-320g. Before capturing the images illustrated in FIG. 2a-2c, a control signal may be broadcasted from at least one of the camera 310, the server 350 and the control unit 330, and electronic labels 320a-320g arranged within the range and/or in the direction of the broadcasted control signal may receive the control signal, as previously discussed.

Prior to the first image, FIG. 2a, there could be another image captured to be used as a control image for identifying changes in the image capture before the control signal has been transmitted and an image captured after the control signal has been transmitted, illustrated in FIG. 2a. The image captured prior to the first image may be captured such that the system 300 knows this image is captured before the electronic labels have had time to start changing their optical output, for example the system may capture this image before transmitting the control signal, simultaneously to transmitting the control signal or after transmitting the control signal within a time where the electronic labels still have had no time to start changing their optical output.

In FIG. 2a the electronic labels 320a, 320e, 320f and 320g are illustrated to have an active optical output and the electronic labels 320b, 320c, 320d are illustrated to have an inactive optical output. Hence, these electronic labels, 320a, 320e, 320f and 320g, have had their respective optical output changed. As previously discussed, there may be an image captured ensuring no optical output is present before capturing the image according to FIG. 2a and/or the system 300 may assume no optical output is present from the electronic labels prior to receiving the control signal. Hence, the change in optical output is detected.

In FIG. 2b the electronic labels 320a, 320c, 320d, 320g are illustrated to have an active optical output and the electronic labels 320b, 320e, 320f are illustrated to have an inactive optical output. Hence, between the image captured in FIG. 2a and the image captured in FIG. 2b the electronic labels 320c, 320e, 320f, 320d have had their respective optical output changed.

In FIG. 2c the electronic labels 320a, 320b, 320d, 320f are illustrated to have an active optical output and the electronic labels 320b, 320e, 320f are illustrated to have an inactive optical output. Hence, between the image captured in FIG. 2b and the image captured in FIG. 2c the electronic labels 320b, 320c, 320f, 320g have had their respective optical output changed.

Accordingly, by analyzing the images in FIG. 2a and FIG. 2b, and FIG. 2b and FIG. 2c respectively, the system 300 may determine the change in optical output for each electronic label 320a-320g arranged within the field of view of the camera 310 and wherein each electronic label 320a-320g has received the control signal. Each electronic label 320a-320g may have a change in optical output where the optical output is a distinct temporal pattern of optical changes, significant for each electronic label 320a-320g. The change in optical output may be associated with the local and/or the global identifier.

In this, by the camera 310, captured sequence, the system 300 may be able to distinguish the electronic labels 320a-320g from each other when analyzing the images. As previously discussed the change in optical output may comprise at least one of a distinct temporal pattern of optical changes, displaying a visual reference, such as at least one of a barcode, a QR code, a number, a letter and the combination thereof and changing the color output of the electronic labels 320a-320g. Hence, FIG. 2a-2c schematically illustrates simply one example of how the change in optical output may be achieved together with the camera 310 capturing a sequence of images. Another example could be capturing one image comprising an optical change from the electronic labels 320a-320g wherein the optical output comprises at least one of displaying a visual reference, such as at least one of a barcode, a QR code, a number, a letter and the combination thereof and changing the color output of the electronic label 320, wherein the visual reference and/or the color output may be unique for each electronic label 320a-320g. The visual reference may be associated with the local and/or global identifier.

The system 300 according to another embodiment will be described with reference to FIG. 3. The system 300 may be similarly configured as the system 300 described with reference to FIGS. 2a-2c, but FIG. 3 is relating to how the control signal may be directed to the at least one electronic label 320.

Figure 3:
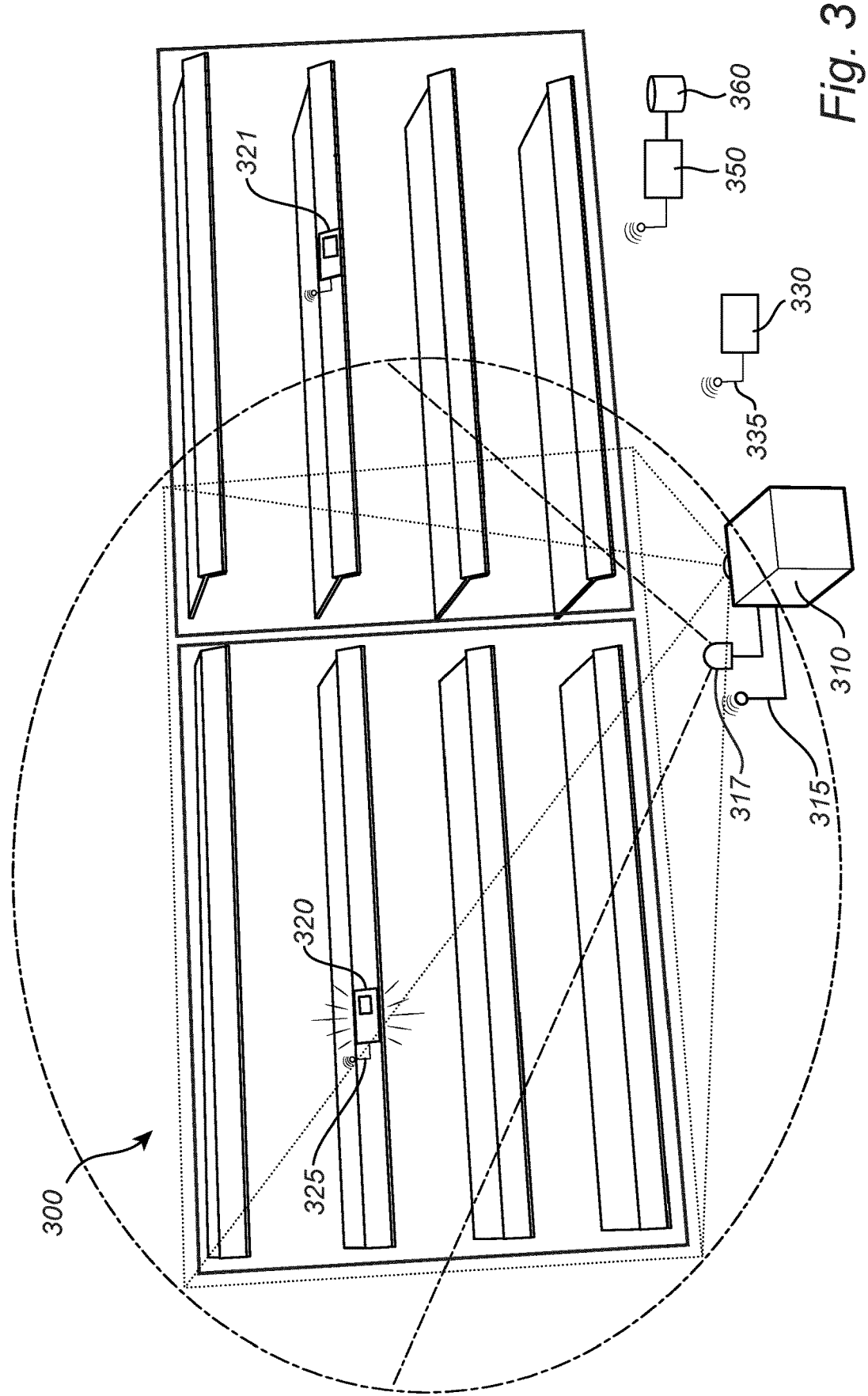
FIG. 3 schematically illustrates a perspective view of the system according to an embodiment.

FIG. 3 schematically illustrates a perspective view of the system 300 according to an embodiment. The system 300 in FIG. 3 is similar to that of the system 300 in FIGS. 1 and 2, except that in FIG. 3 the transceiver 315 may comprise an optical transmitter 317. FIG. 3 illustrates a camera 310 and an electronic label 320 arranged within the field of view of the camera 310. The optical transmitter 317 may comprise a LED, the LED may be arranged to emit at least one of visible light, UV-light or IR-light.

The camera 310 may transmit the control signal using at least one of the transceiver 315 and the optical transmitter 317. As previously discussed, the transceiver 315 may have a limited range and only the at least one electronic label 320 arranged within the limited range may receive the control signal. Electronic labels being out of range may not receive the control signal and hence, may not have its optical output changed.

Analogously, the optical transmitter 317 may have a limited range. The control signal transmitted from the optical transmitter 317 may be directed. This may further facilitate limiting the electronic labels 320 to be controlled to have their optical output changed. In other words, the optical transmitter 317 may be directed to an area, wherein electronic labels 320 within that area may be controlled to have their optical output changed. More specifically, the optical transmitter 317 may be pointing in a direction creating a cone of illuminance transmitted from the optical transmitter, wherein the cone of illuminance comprises the control signal and wherein electronic labels 320 arranged within that cone of illuminance may be controlled to have their optical output changed.

This is illustrated in FIG. 3, the optical transmitter 317 is transmitting an optical signal, wherein the optical signal may comprise the control signal. The optical signal may comprise electromagnetic radiation in wavelengths corresponding to wavelengths for at least one of UV, visible or IR radiation. The optical signal may have a limited range in the direction of the light propagation. The optical signal may have a limited area and/or volume being illuminated, as previously described. This may result in a projected area of illuminance in a plane comprising the at least one electronic label 320, in FIG. 3 this plane may be the shelf and/or shelves comprising the at least one electronic label 320. Objects arranged outside this projected area of illuminance, such as the electronic label 321 will not receive the transmitted optical signal. Hence, the electronic label 321 will not be controlled to have its optical output changed. The optical transmitter 317 may be arranged so that the electronic labels 320 being controlled to have their optical output changed matches the electronic labels 320 within the field of view of the camera 310. The optical transmitter 317 and the camera 310 may be arranged to that the camera 310 captures at least one image of a portion of the electronic labels 320 illuminated by the optical transmitter. This is schematically illustrated in FIG. 3, as the cone of illuminance form the optical transmitter is larger than the area imaged by the camera 310 in a plane comprising the electronic labels 320.

The cone of illuminance from the optical transmitter may further facilitate directing the control signal and hence this may further facilitate limiting the number of electronic labels receiving the control signal. In turn, this may further facilitate saving power while positioning and identifying the electronic labels.

The optical transmitter 317 in FIG. 3 is arranged on the camera 310. However, the optical transmitter 317 is not limited to be arranged on the camera 310, but can also be arranged as a separate unit next to the camera 310 or on anyone of the server 350 and the control unit 330 and may be controlled by the camera through a control signal 381. The camera 310 may transmit a control signal 380 directly to be received by the electronic label 320 and/or the camera 310 may transmit a control signal 380, 381 to the electronic label 320 via at least one of the server 350 and the control unit 330.

As illustrated in FIG. 3, the optical transmitter transmits a signal, wherein the signal comprises the control signal. However, the idea of limiting the number of electronic labels 320 to be controlled to have their optical output changed as illustrated in FIG. 3, is not limited to an optical signal. The signal that may comprise the control signal could be any signal with limitation in range and/or direction know in the art of communication.

Figure 4:
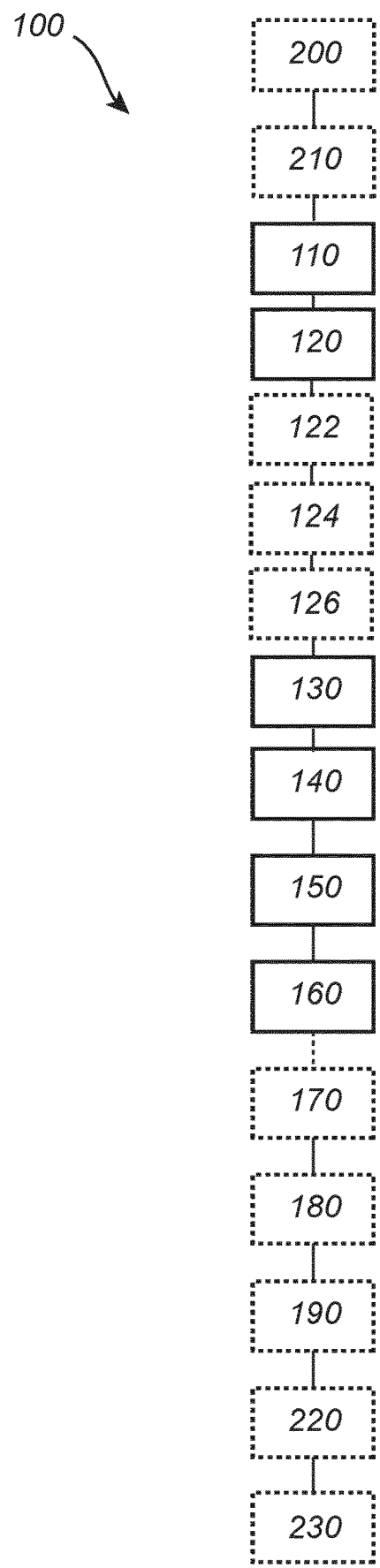
FIG. 4 schematically illustrates a flow chart of the method according to an embodiment.

A method 100 for determining an identity and a position of at least one electronic label in a retail environment according to an embodiment will now be described with reference to FIG. 4. For clarity and simplicity, the method will be described in terms of 'steps'. It is emphasized that steps are not necessarily processes that are delimited in time or separate from each other, and more than one 'step' may be performed at the same time in a parallel fashion.

The method 100 for determining an identity and a position of at least one electronic label in a retail environment is provided, wherein each electronic label comprises a respective receiver for receiving a control signal and is adapted to change its optical output in response to the control signal, the at least one electronic label is arranged within the field of view of a camera comprising a transmitter for transmitting a control signal.

The method 100 may comprise the steps of transmitting 110 a control signal from the camera, receiving 120, by the respective receiver, the control signal from the camera, controlling 130 the at least one electronic label to change its optical output based on the control signal, capturing 140, by the camera, an image containing the at least one electronic label, detecting 150 an identifier of each of the at least one electronic label by analyzing the optical output in the image, and determining 160 a position for each of the at least one electronic label based on the position of the at least one electronic label in the image.

After transmitting 110 the control signal, the camera may have a predefined time to when it initiates capturing 140 an image containing the at least one electronic label. Thus, in order to capture images at the correct point in time for the change in optical output to be captured in the at least one image. The control signal may comprise a time stamp together with a desired time delay in order for the electronic label to change its optical output at a desired time. There may also be a predetermined delay, from which the electronic label receives the control signal to when the electronic label start to change its optical output. There may be a predetermined delay, from which the camera transmits the control signal to when the camera starts capturing the at least one image. The predetermined delay, from which the electronic labels receives the control signal to when the electronic label start changing its optical output, and the predetermined delay from which the camera transmits the control signal to when the camera starts capturing the at least one image, may be adapted and/or matched so that the captured images comprises the change in optical output of the electronic labels. The frequency of which the electronic labels change their optical output and the frequency of which the camera captures the at least one image may also be adapted and/or matched in order to facilitate capturing the change in optical output of the electronic labels. The delay may be a relative delay or an absolute time.

The change of optical output of the at least one electronic label may include a distinct temporal pattern of optical changes for each label. The step of capturing 140, by the camera, an image comprising the at least one electronic label may comprise capturing images by the camera at points in time such that the distinct temporal pattern of optical changes is distinguishable in the images. The step of detecting 150 an identifier of the at least one electronic label by analyzing the optical output in the image may comprise detecting the distinct temporal pattern of optical changes.

The method may further comprise of controlling 122 the at least one electronic label to change its optical output according to a second pattern of optical changes based on the control signal.

The method may further comprise capturing 124, by the camera, an image containing the at least one electronic label and determining 126 a region of interest in the image for the at least one electronic label wherein the region of interest is associated with a position of the at least one electronic label in the image.

The steps of controlling 122, capturing 124 and determining 126 may be performed prior to controlling 130 the at least one electronic label to change its optical output based on the control signal.

Hence the method 100 may provide determination of a region of interest in the image for the at least one electronic label wherein the region of interest is associated with a position of the at least one electronic label in the image. Hence, coordinates of the location of each electronic label in images to be captured with the camera may be known. Based on this information, the positions of electronic label(s) in future acquisitions or capturing of images using the camera may be known. The known positions of electronic labels may be a rough position, i.e. an estimate where the electronic label may be located in the images.

Hence, the step of detecting 150 an identifier of the at least one electronic label by analyzing the optical output in the image may further comprise detecting the distinct temporal pattern of optical changes by analyzing the image based on the determined region of interest.

Hence, only the region of interest in the images may be analyzed in order to detect the identifier of the at least one electronic label. In other words, only part of the captured images may be analyzed in order to detect the identifier of the at least one electronic label.

The method may also comprise transmitting, by the camera, a second control signal arranged to be received by the electronic label wherein the step of controlling 122 the at least one electronic label to change its optical output according to a second pattern of optical changes may be based on the second control signal. Hence, there may be a control signal for controlling the output of the electronic labels to comprise a distinct temporal pattern of optical changes and a second control signal for controlling the output of the electronic label to comprise a second pattern of optical changes. The second pattern of optical change may be a pattern wherein all the electronic labels are changing their optical output according to the second pattern simultaneously, simply in order to determine rough positions of the electronic labels in the image.

The change in optical output of the at least one electronic label may include displaying a visual reference.

The step of transmitting 110 a control signal from the camera may comprise transmitting at least one of a Wifi signal, an IR signal, a BLE signal, an NFC signal, a RF signal, an optical signal and a sound signal.

The step of transmitting 110 a control signal from the camera may comprise at least one of transmitting and broadcasting a control signal from the camera to electronic labels within the field of view of the camera.

By broadcasting may be meant that the camera may transmit the control signal without prior knowledge of at least one of the identity and the position of the at least one electronic label.

The step of transmitting 110 a control signal from the camera may comprise at least one of transmitting and broadcasting a control signal from the camera to electronic labels arranged within and outside the field of view of the camera. Preferably, the transmitting or broadcasting to the number of electronic labels arranged outside the field of view of the camera may be kept to a minimum in order to not initiate change of optical output in electronic labels not arranged in the field of view of the camera, i.e. electronic labels not viewed by the camera as such electronic labels will not be comprised in the captured image.

The control signal may be directed in a predetermined direction in order to target a specific area comprising at least one electronic label. Hence, the step of transmitting 110 a control signal may comprise directing the control signal. In other words, the step of transmitting 110 a control signal may comprise transmitting a control signal in a predetermined direction.

The camera may further be arranged to transmit the image comprising the at least one electronic label and the server may be arranged to receive the image of the electronic label, thus the method 100 may further comprise the steps of transmitting 170 the image of the electronic label from the camera to the server. The method may further comprise receiving 180, by the server, the image of the electronic label, and detecting 150 an identifier of the electronic label by analyzing the optical output in the image.

That is, the step of determining 160 a position of the electronic label based on the position of the electronic label in the image may be performed by said server.

By transmitting the image from the camera to the server and by receiving the image by the server this provides for the server to perform detection of the electronic label in the image. When the server performs the step of determining a position this may facilitate the detection of the electronic label in the image since the server may generally have better signal processing capabilities compared to that of a camera.

The step of determining 160 a position of the electronic label may comprise determining a spatial position. I.e. the determined position of the electronic label in the image may be associated with a spatial position. This, since the camera position may be known beforehand or by analyzing the image. By analyzing the image, reference object may be detected in the image facilitating determining the position of the camera. The position of the camera may also be determined by analyzing the signal communication between the camera and the server and/or control unit.

A second camera may be arranged in the field of view of a first camera and the first camera may be configured to detect the second camera by analyzing the image. I.e. The step of determining 160 a position of the electronic label may comprise detecting a second camera in the captured image, wherein the second camera has a known position.

The position of the camera may be determined by at least one of image processing, image analysis and in any way known in the art of image detection.

The method may further comprise the step of storing 190 the position and the identifier of the electronic label.

The method 100 may further comprise the step of transferring the position and the identifier to a storage means for storing the data.

The method 100 may further comprise the step of comparing 230 the current identifier and position to previously stored identifier and position.

The method 100 may comprise the steps of receiving 200, by the camera, a start signal and initiate or start transmitting 210 the control signal from the camera in response to said start signal. Wherein the control signal transmitted from the camera initiates change in optical output in electronic label receiving the control signal. The start signal may be transmitted from at least one of a server and a control unit. The server or control unit may transmit the start signal to a plurality of cameras and may coordinate the cameras in order for the cameras not to initiate electronic labels simultaneously avoiding interference between different cameras.

The method 100 may comprise the step of detecting 220 a display device associated with an electronic label by analyzing the image.

The display device may comprise information associated with for the information presented on the associated electronic label and/or information associated with a position in the retail environment, e.g. a shelf position and/or a product position, with the product itself, and/or the product unit. The display device may be an analogue display device, such as a printed information sign or digital display device.

The step of detecting 220 a display device may comprise analyzing the image and associating the information presented on the display device to the associated electronic label.

The person skilled in the art realizes that the present invention by no means is limited to the embodiments described above. On the contrary, many modifications and variations are possible within the scope of the appended claims. For example, features from the embodiments described with reference to FIGS. 1, 2 and 3 may be combined. For example, there could be one or a plurality of electronic labels present. Even though the inventive concept is directed to control of the optical output of electronic labels being arranged within the field of view of the camera, the transmitted control signal may reach electronic labels arranged outside the field of view of the camera.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Itemized List of Examples

1. A method (100) for determining an identity and a position of at least one electronic label in a retail environment, wherein each electronic label comprises a respective receiver for receiving a control signal and is adapted to change its optical output in response to the control signal, the at least one electronic label is arranged within the field of view of a camera comprising a transmitter for transmitting a control signal, the method comprises:
   transmitting (110) a control signal from the camera;
   receiving (120), by the respective receiver, the control signal from the camera;
   controlling (130) the at least one electronic label to change its optical output based on the control signal;
   capturing (140), by the camera, an image containing the at least one electronic label;
   detecting (150) an identifier of each of the at least one electronic label by analyzing the optical output in the image;
   determining (160) a position for each of the at least one electronic label based on the position of the at least one electronic label in the image.

2. The method (100) according to example 1, wherein the change of optical output of the at least one electronic label includes a distinct temporal pattern of optical changes for each label;
   wherein capturing (140), by the camera, an image comprising the at least one electronic label comprises capturing images by the camera at points in time such that the distinct temporal pattern of optical changes is distinguishable in the images; and
   wherein detecting (150) an identifier of the at least one electronic label by analyzing the optical output in the image comprises detecting the distinct temporal pattern of optical changes.

3. The method (100) according to example 1 and example 2, wherein the method further comprises
   controlling (122) the at least one electronic label to change its optical output according to a second pattern of optical changes based on the control signal;
   capturing (124), by the camera, an image containing the at least one electronic label;
   determining (126) a region of interest in the image for the at least one electronic label wherein the region of interest is associated with a position of the at least one electronic label in the image;
   wherein detecting (150) an identifier of the at least one electronic label by analyzing the optical output in the image further comprises detecting the distinct temporal pattern of optical changes by analyzing the image based on the determined region of interest.

4. The method (100) according to example 1, wherein the change in optical output of the at least one electronic label includes displaying a visual reference.

5. The method (100) according to any one of the preceding examples, wherein transmitting (110) a control signal from the camera comprises transmitting at least one of a Wireless Fidelity, Wifi, signal, an Infrared, IR signal, a Bluetooth Low Energy, BLE, signal, a Near-Field communication, NFC, signal, a Radio Frequency, RF, signal, an optical signal and a sound signal.

6. The method (100) according to any one of the preceding examples, wherein transmitting (110) a control signal from the camera comprises broadcasting a control signal from the camera to electronic labels within the field of view of the camera.

7. The method (100) according to any one of the preceding examples,
   wherein the camera is further arranged to transmit the image comprising the at least one electronic label;
   wherein a server is arranged to receive the image of the electronic label;
   wherein the method (100) further comprises:
   transmitting (170) the image of the electronic label from the camera;
   receiving (180), by the server, the image of the electronic label;
   detecting (150) an identifier of the electronic label by analyzing the optical output in the image; and
   wherein determining (160) a position of the electronic label based on the position of the electronic label in the image is performed by said server.

8. The method (100) according to any one of the preceding examples, wherein determining a position of the electronic label comprises determining a spatial position.

9. The method according to any one of the preceding examples, wherein the method comprises:
   storing (190) the position and the identifier of the electronic label.

10. The method (100) according to any one of the preceding examples, wherein the identifier of the electronic label is a local identifier.

11. The method (100) according to any one of the preceding examples, wherein the system comprises a first and a second camera, the second camera being within the field of view of the first camera, and wherein the first camera is configured to detect the second camera by analyzing the image.

12. The method (100) according to any one of the preceding examples, wherein the method (100) comprises;
   receiving (200), by the camera, a start signal;
   start transmitting (210) the control signal from the camera in response to said start signal.

13. The method according to any one of the preceding example, wherein the method comprises;
   detecting (220) a display device associated with an electronic label by analyzing the image.

14. A system (300) for determining an identity and a position of an electronic label (320), the system comprising:
   a camera (310) arranged to capture at least one image of the electronic label and wherein the camera is arranged to transmit a control signal;
   an electronic label (320) adapted to receive the control signal and adapted to change its optical output in response to said control signal, the electronic label being arranged in the field of view of the camera;
   a control unit (330) adapted to communicate with the camera (310) and configured to detect an identifier of the electronic label (320) by analyzing the optical output in the image and configured to determine a position of the electronic label based on the position of the electronic label in the image.

15. The system according to example 14, wherein the camera is positioned at, at least one of, a shelf, a ceiling and a wall.

16. The system according to any one of examples 14 and 15, wherein the camera is powered by at least one of a battery and an external power source.

17. The system according to example 14, wherein the camera is comprised in a mobile device.

The invention claimed is:

1. A method for determining an identity and a position of at least one electronic label in a retail environment, wherein each electronic label comprises a respective receiver for receiving a control signal and is adapted to change its optical output in response to the control signal, the at least one electronic label is arranged within a field of view of a camera comprising a transmitter for transmitting a control signal, the method comprising:
   transmitting a control signal from the camera;
   receiving, by the respective receiver, the control signal from the camera;
   controlling the at least one electronic label to change its optical output based on the control signal;
   capturing, by the camera, an image containing the at least one electronic label;
   detecting an identifier of each of the at least one electronic label by analyzing the optical output in the image; and
   determining a position for each of the at least one electronic label based on the position of the at least one electronic label in the image;
   wherein the change of optical output of the at least one electronic label includes a distinct temporal pattern of optical changes for each label, and wherein the optical changes are changing in a distinct way characteristic for a certain electronic label;

wherein capturing, by the camera, an image comprising the at least one electronic label comprises capturing images by the camera at points in time such that the distinct temporal pattern of optical changes is distinguishable in the images; and wherein detecting an identifier of the at least one electronic label by analyzing the optical output in the image comprises detecting the distinct temporal pattern of optical changes.

2. The method according to claim 1, further comprising:
controlling the at least one electronic label to change its optical output according to a second pattern of optical changes based on the control signal;
capturing, by the camera, an image containing the at least one electronic label;
determining a region of interest in the image for the at least one electronic label wherein the region of interest is associated with a position of the at least one electronic label in the image;
wherein detecting an identifier of the at least one electronic label by analyzing the optical output in the image further comprises detecting a distinct temporal pattern of optical changes by analyzing the image based on the determined region of interest.

3. The method according to claim 1, wherein the change in optical output of the at least one electronic label includes displaying a visual reference.

4. The method according to claim 1, wherein transmitting a control signal from the camera comprises transmitting at least one of a Wireless Fidelity, Wifi, signal, an Infrared (IR) signal, a Bluetooth Low Energy (BLE) signal, a Near-Field communication (NFC) signal, a Radio Frequency (RF) signal, an optical signal and a sound signal.

5. The method according to claim 1, wherein transmitting a control signal from the camera comprises broadcasting a control signal from the camera to electronic labels within the field of view of the camera.

6. The method according to claim 1, wherein the camera is further arranged to transmit the image comprising the at least one electronic label,
wherein a server is arranged to receive the image of the at least one electronic label,
the method further comprising:
transmitting the image of the at least one electronic label from the camera;
receiving, by the server, the image of the at least one electronic label; and
detecting an identifier of the at least one electronic label by analyzing the optical output in the image, and
wherein determining a position of the at least one electronic label based on the position of the at least one electronic label in the image is performed by said server.

7. The method according to claim 1, wherein determining a position of the at least one electronic label comprises determining a spatial position.

8. The method according to claim 1, further comprising:
storing the position and the identifier of the at least one electronic label.

9. The method according to claim 1, wherein the identifier of the at least one electronic label is a local identifier.

10. The method according to claim 1, wherein a system performing the method comprises a first camera and a second camera,
the second camera is within the field of view of the first camera, and the first camera is configured to detect the second camera by analyzing the image.

11. The method according to claim 1, further comprising:
receiving, by the camera, a start signal; and
start transmitting the control signal from the camera in response to said start signal.

12. The method according to claim 1, further comprising:
detecting a display device associated with an electronic label by analyzing the image.

13. A system for determining an identity and a position of an electronic label, the system comprising:
a camera arranged to capture an image of the electronic label and wherein the camera is arranged to transmit a control signal;
an electronic label adapted to receive the control signal and adapted to change its optical output in response to said control signal, the electronic label being arranged in a field of view of the camera; and
a control unit adapted to communicate with the camera and configured to detect an identifier of the electronic label by analyzing the optical output in the image and configured to determine a position of the electronic label based on the position of the electronic label in the image;
wherein the change of optical output of the electronic label includes a distinct temporal pattern of optical changes for each label, and wherein the optical changes are changing in a distinct way characteristic for a certain electronic label;
wherein capturing, by the camera, an image comprising the electronic label comprises capturing images by the camera at points in time such that the distinct temporal pattern of optical changes is distinguishable in the images; and
wherein detecting an identifier of the electronic label by analyzing the optical output in the image comprises detecting the distinct temporal pattern of optical changes.

14. The system according to claim 13, wherein the camera is positioned at, at least one of, a shelf, a ceiling and a wall.

15. The system according to claim 13, wherein the camera is powered by at least one of a battery and an external power source.

16. The system according to claim 13, wherein the camera is comprised in a mobile device.

17. The system according to claim 13, wherein the control unit further configured to:
controlling the electronic label to change its optical output according to a second pattern of optical changes based on the control signal;
capturing, by the camera, an image containing the electronic label; and
determining a region of interest in the image for the electronic label wherein the region of interest is associated with a position of the electronic label in the image;
wherein detecting an identifier of the electronic label by analyzing the optical output in the image further comprises detecting the distinct temporal pattern of optical changes by analyzing the image based on the determined region of interest.

18. The system according to claim 14, wherein the camera is powered by at least one of a battery and an external power source.

* * * * *